April 5, 1932.  J. P. CLASSEN  1,851,968
VEHICLE OPERATED GATE
Filed Aug. 27, 1930
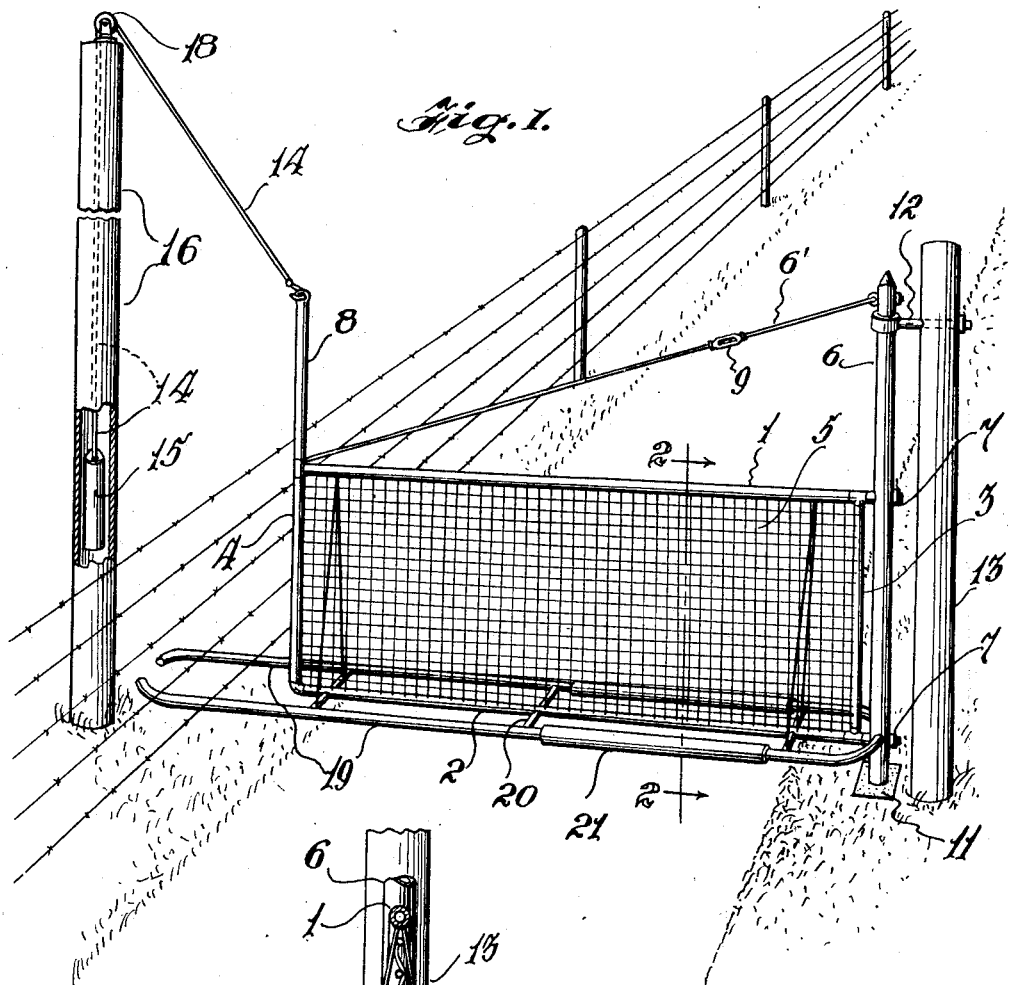
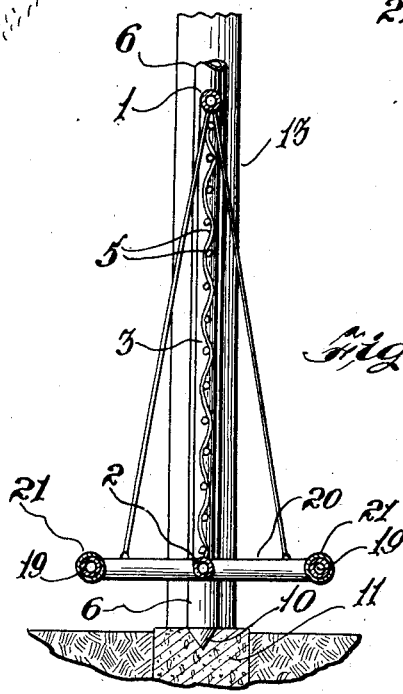
INVENTOR.
J. P. Classen,
BY John M. Spellman
ATTORNEY.

Patented Apr. 5, 1932

1,851,968

UNITED STATES PATENT OFFICE

JOHN P. CLASSEN, OF SAN ANTONIO, TEXAS

VEHICLE OPERATED GATE

Application filed August 27, 1930. Serial No. 478,122.

My invention relates to new and useful improvements in vehicle-operated gates, and the primary object of my invention in this connection is the provision of a gate of this class which is opened by the pressure of the wheels of the vehicle and closed by a suspended weight.

Another particular object of my invention is the means employed for permitting the wheels of the vehicle to bear against but without actually coming into contact with the gate itself and for maintaining this contact until after the vehicle has passed beyond the gate.

A further object of the invention resides in the means for preventing injury to the wheels of the vehicle when the gate is opened.

With the above objects in view, my invention will be fully understood from a perusal of the following detailed description, taken in connection with the accompanying drawings and wherein:

Figure 1 is a perspective view of my improved gate in closed position, one of the posts which support the gate being partly broken away for the purpose of better illustration; and Figure 2 is an enlarged vertical section through the gate, the view being had along the line 2—2 of Figure 1.

Proceeding in accordance with the drawings and wherein similar numerals will designate the various parts of the gate, 1 denotes the top bar, 2 the lower bar, and 3 and 4 the vertical bars. A webbing 5 or other suitable material, spans the space between the top, bottom and vertical bars and forms an oblong closure. The ends of the top and bottom rods 1 and 2 project beyond the vertical bar 3 and are secured to a larger vertically-disposed bar 6, the bars 1 and 2 being passed through the bar 6 and fastened thereto by the nuts 7. The vertical bar 4 is extended upwardly above the bar 1 and forms a projection 8.

For strengthening the gate a wire or rod 6' with a turnbuckle 9 is connected to the projection 8 and to the top of the vertical bar. However, these bars may be of piping such as shown in the drawings, or of any suitable material and in any thickness used in gate structures.

For suspending or hanging the gate in position the lower end of the vertical bar 6 as at 10, in Figure 2, is pointed and supported to turn in a depression in a concrete base 11. The upper end of this bar 6 is provided with a collar with a bolt 12 and passed through the top of a post 13. In this manner the gate can be freely swung in the opening and closing thereof, the pointed end of the bar 6 forming a pivot.

The gate is closed and maintained in this position by a flexible element 14, loosely secured to the upper end of the projection 8 and a weight 15 carried on the element and disposed in the hollow post 16. A pulley 18 is provided for the flexible element 14.

The gate is provided with a guard in the form of two parallel rods 19, one on each side of the gate, and adjacent the bottom bar 2, and held in rigid and spaced relation to the gate by the cross-rods 20. These rods 19 project beyond the front end of the gate, preferably passing underneath the fence A, and are provided at a point in line with the front right wheel of the vehicle with bumper rods 21. The bumper rods are made to fit loosely around the rods 19 so that they will rotate slightly when the wheel of the vehicle strikes them and thus prevent injury to the tires or wheels.

From the foregoing it will now be apparent that when the wheel of the vehicle strikes the bumber rod 21 on either side of the gate, and the vehicle moved slowly against the gate, the latter will swing open, the weight 15 ascending. The post 16 is high enough so that when the gate is swung aside the element 14 will clear the top of the vehicle, and likewise the rods 19 are sufficiently spaced from the gate itself to prevent contact with the fenders of the vehicle. The rods 19 projecting beyond the front end of the gate will allow the vehicle to pass, holding the gate open until the rear end of the vehicle is well past the swinging zone of the gate. The pulley 18 is of the swivel type and permits the flexible element to move freely. Suitable small posts are provided to limit the swinging movement of the gate in either direction as stops. The post 16 need not necessarily be hollow, as guide means may be provided to maintain the weight 15 in proper position.

Other modifications may be made in the construction of my invention, and it is to be understood that I do not limit myself to the precise construction here shown, as alterations may be made other than those suggested, and such as would be within the scope and meaning of the appended claims.

What I claim as new and desire to secure by Letters Patent is:

1. A gate of the character described embodying a framework, the end vertical bars of the latter extending above the body of the gate, one of said bars being pivoted in a support in the ground and pivotally supported at its upper end to a post; the other or front vertical bar of the framework having its upper end connected to a flexible element; a post spaced from the front vertical bar and extending above the height of the front vertical bar, a weight on said flexible element and means for permitting said flexible element to ride from the upper end of said post when the weight is raised and lowered; said framework including bars spaced from the opposite sides thereof and parallel therewith, said bars extending beyond the front end of the gate and adapted to engage with the vehicle in the operation of the gate until the vehicle has cleared the gate body.

2. A gate of the character described and as claimed in claim 1, said spaced and parallel bars on the sides of the gate including bumper rods frictionally engaged with said bars; the extended bars beyond the front end of the gate adapted to pass under a fence associated with the gate and the ground and clear of said post spaced from said front vertical bar; said post of a height sufficient to permit the flexible element to clear the top of a vehicle when the gate is operated.

In testimony whereof I affix my signature.

JOHN P. CLASSEN.